United States Patent [19]
Rohner

[11] Patent Number: 5,450,309
[45] Date of Patent: Sep. 12, 1995

[54] METHOD AND DEVICE FOR SWITCHING INVERTERS IN PARALLEL

[75] Inventor: Ronald Rohner, Baden, Switzerland

[73] Assignee: Inventio AG, Hergiswill, Switzerland

[21] Appl. No.: 923,810

[22] PCT Filed: Nov. 18, 1991

[86] PCT No.: PCT/CH91/00236

§ 371 Date: Dec. 9, 1992

§ 102(e) Date: Dec. 9, 1992

[87] PCT Pub. No.: WO92/09137

PCT Pub. Date: May 29, 1992

[30] Foreign Application Priority Data

Nov. 19, 1990 [CH] Switzerland ............ 3656/90
Nov. 19, 1990 [CH] Switzerland ............ 3658/90

[51] Int. Cl.6 .......................... H02M 7/77
[52] U.S. Cl. ........................ 363/71; 307/82
[58] Field of Search ............ 307/58, 82, 87, 151; 363/36, 71

[56] References Cited

U.S. PATENT DOCUMENTS 4,328,429  5/1982  Kublick ............... 307/58
4,441,032  4/1984  Sakurai et al. ......... 307/82
4,673,823  6/1987  Tanaka ................ 307/11
5,200,643  4/1993  Brown ................. 307/53

FOREIGN PATENT DOCUMENTS

0489971A1  6/1992  European Pat. Off.
3602496    7/1987  Germany.
3840806    5/1990  Germany.
4023207C1  4/1991  Germany.
4023207    4/1991  Germany.
4038869    8/1991  Germany.
2098414   11/1982  United Kingdom.

Primary Examiner—Steven L. Stephan
Assistant Examiner—Adolf Berhane
Attorney, Agent, or Firm—Fay, Sharpe, Beall, Fagan, Minnich & McKee

[57] ABSTRACT

An efficient, high-speed switching system for parallel inverters is particularly suited for inverters employing pulse modulation. Inverters with an arbitrary number of outputs are mutually connected, either directly or through impedance coils. The system provides switching, in parallel, of an arbitrary number of the inverters. The system allows for control of current distribution between the inverters.

19 Claims, 7 Drawing Sheets

METHOD AND DEVICE FOR SWITCHING INVERTERS IN PARALLEL

BACKGROUND OF THE INVENTION

The construction of fast inverters comprising several single elements connected in parallel is only possible with rather large expenditure for control and electronic circuitry. This is only acceptable if the inverter must satisfy certain conditions which cannot be satisfied in another way, and/or if the parallel switching arrangement has certain decisive advantages in comparison with usual solutions comprising only a single element.

Figure 1:
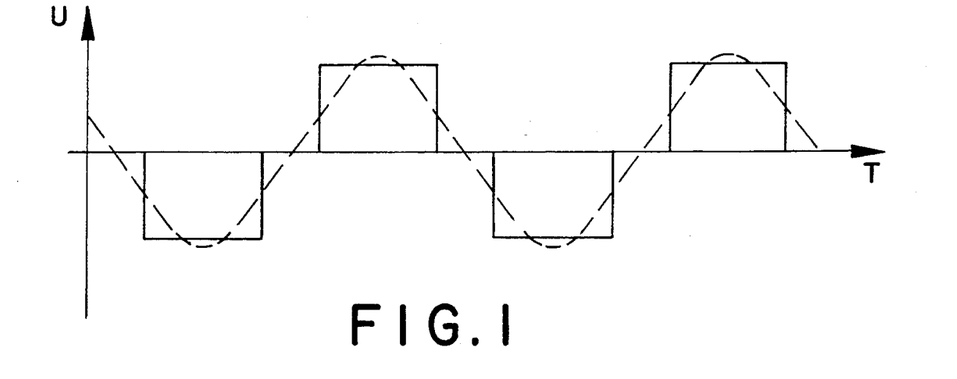
FIG. 1 shows the output voltage of a single-phase bridge circuit with an elementary wave timing.

It is an aim of present-day builders of motors to produce motors which run ever faster. So-called "fast-running drives" require operational frequencies which exceed 500 Hz. In view of the power aimed at, in the range of several hundred kVA, usual thyristor- or GTO (gate turn off) inverters can at best provide these frequencies in the shape of elementary steps, as shown in FIG. 1.

Figure 2:
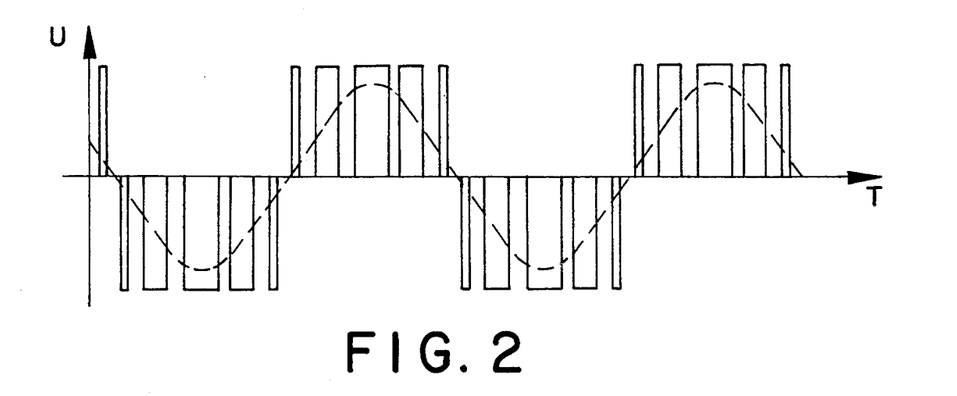
FIG. 2 shows the output voltage of a single-phase bridge circuit with pulse modulation.

The drawbacks of this crude, rectangle-shaped voltage and of the non-sinus shaped current curve which it entails, that is additional losses and peaks of the moment are well known. It has therefore been known for a long time to divide these voltage segments into smaller time units, in order to obtain a nearly sinusoidally-shaped curve of the motor current. With respect to the inverter this entails that the power switches must be switched on and off accordingly faster. The faster these switches work, the finer one can make the time slices of the voltage segments, and the more sinusoidally-shaped the motor current becomes, see FIG. 2.

If now the operational frequency of the usual 50 to 120 Hz is raised to over 500 Hz at fast-running drives, then the switching frequency of the switches must also be increased accordingly. This means that the thyristor- and GTO switches come even nearer to the limits of their switching speed.

Fast inverters with switching frequencies up to 100 kHz and able to deliver a sinusoidally-shaped current curve even with 500 Hz output frequency are normally available only up to a power of about 50 kVA. An increase of the power up to several hundred kVA with the same high clock frequency is scarcely imaginable with present-day techniques, hence the desire to use inverters which are connected in parallel.

The design of a parallel connected inverter differs in many ways from that of an inverter built in the usual way. Whilst hitherto the control, switching and the protection of the power rectifiers were the essential issues, general design considerations now come into the foreground. Protection problems cannot be considered as local issues any more, but must be viewed in relation to the overall system. Communication problems between the partial inverters must be solved, as must those which pertain to the reliability of a distributed system. One must never forget that the release time, that is the time available for collecting, processing, and distributing instructions to the entire system may not exceed a few microseconds. In what follows it will therefore be considered how a technically and economically acceptable arrangement of parallel connected inverters may look like.

In what follows different possibilities to connect inverters in parallel will be considered and a systematic description will be attempted. We will distinguish the following four main criteria:
coupling of energy
realisation of the connection on the load-side
timing
regulating of the current.

The coupling of the energy, i.e. the collection of the energies delivered by the partial inverters, can be performed electrically or magnetically. If one uses an electrical coupling, the different phases of the partial inverters will be connected, and the load will be attached in the usual way. A magnetic coupling is said to exist for instance when using a motor with multiple winding.

Figure 4:
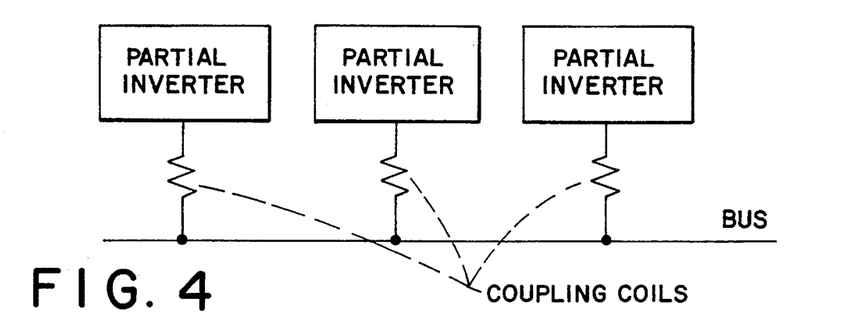
FIG. 4 shows partial inverters which are connected in parallel through connections which comprise connecting induction coils on the powerside.

In the case of an electrical coupling, the partial inverters can be mutually connected either through large connecting coils which have a function tied to the system as a whole, or through small coils which solely act as protection. This last case is called a direct coupling, see FIG. 4.

Figure 5:
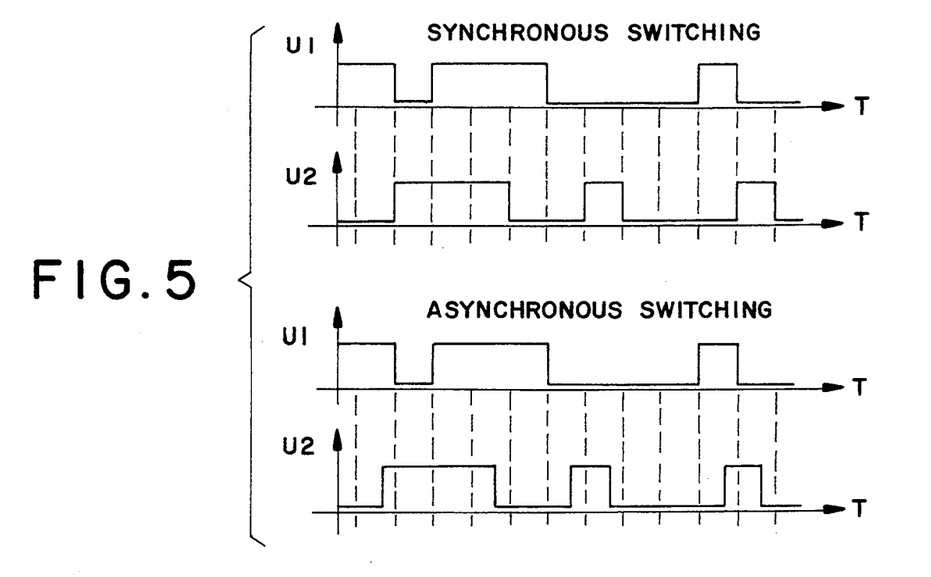
FIG. 5 shows the synchronous and asynchronous switching (timing) of two inverters. When the switching is synchronous, the switching times of both inverters (U1 and U2) coincide exactly. In the asynchronous case the switching will at most occasionally coincide in time, because there is no coupling in time between the inverters.

The timing relates to the switching times of the power switches. If these are switched in accordance with the same time grid for all partial inverters, this is termed as synchronous timing, and else as asynchronous timing, see FIG. 5.

Figure 6:
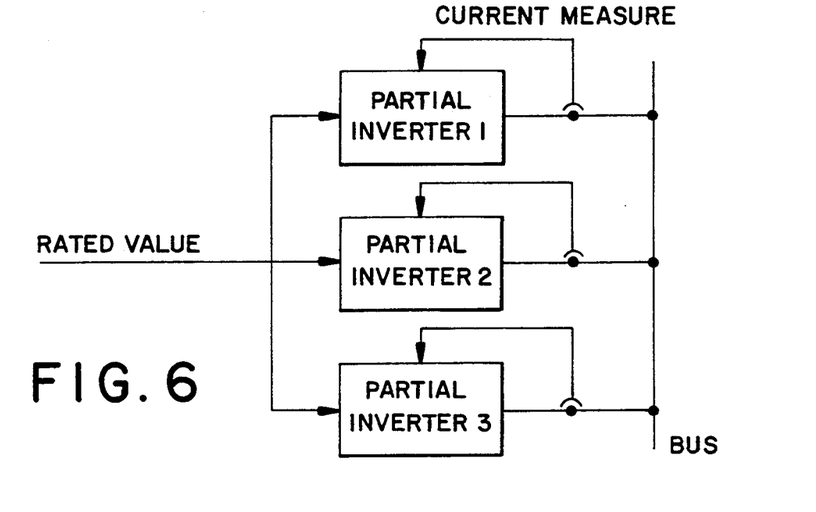
FIG. 6 shows the individual regulation of the current of each single partial inverter, independently from all others.
Figure 7:
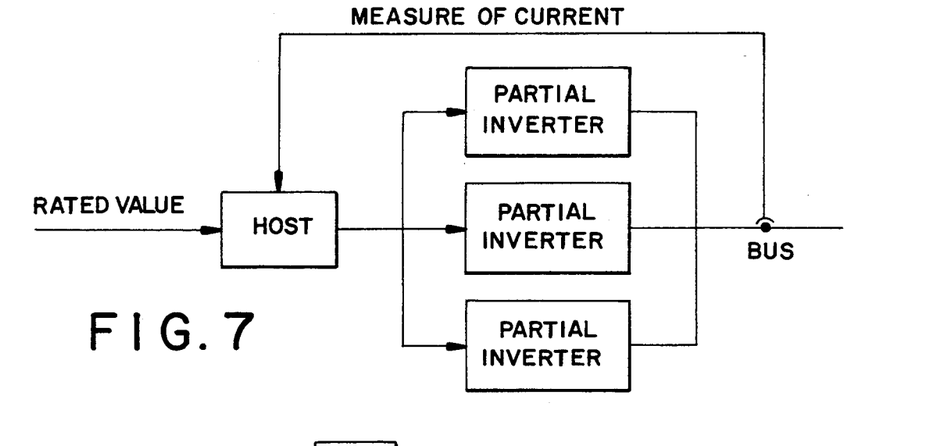
FIG. 7 shows three inverters connected in parallel and regulated by a global measure of current. The "host" represents a master computer system which performs the global regulation of the current and commands the partial inverters accordingly.

If each partial inverter controls a current independently of the others, one has a single current regulation, see FIG. 6. A global current regulation is said to exist when the total output current of all partial inverters is measured and controlled, see FIG. 7.

If one combines the above features, one obtains parallel inverters with widely differing characteristics. They differ in particular in the following respects:
technical features
construction possibilities
economy
redundancy features.

The most important possibilities shall now be briefly presented and described.

Figure 8:
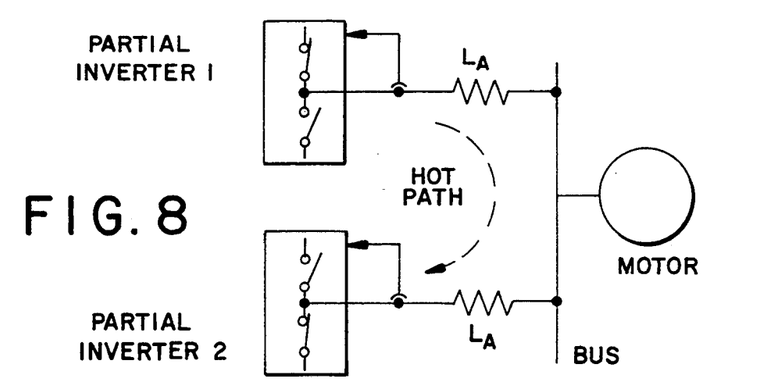
FIG. 8 shows the "hot path" between two partial inverters. The full voltage between the circuits lies across the two switches and the connection coils $L_A$.

This way of coupling represents the most simple electrical connection between inverters. All partial inverters are given the same rated value of the current, and then each single one endeavours to make its output current equal to the rated value. However, this may have the result that for instance the first partial inverter closes the upper switch of phase A, whilst the second partial inverter simultaneously closes the lower switch of the same phase. This generates a "hot path" between these two partial inverters and unavoidably destroys the switches. This can only be avoided by inserting sufficiently large inductive coils between the partial inverters and the bus-bar, in order to limit the current increase, see FIG. 8.

The drawbacks of this solution are:
unsatisfactory dynamic because of the large coils
limited efficiency
large size of the coils.

The task of the connecting coils is a limitation of the current increase in the "normal working case" of a "hot path between the partial inverters". However, such coils also limit the largest achievable current increase on the load side.

The smaller the connecting coils get, the stronger is the mutual influence of the partial inverters on each other. This results in a mutual stir up, that is idle power is pushed back and forth between the partial inverters and the efficiency drops accordingly. One must also not underestimate the extremely large size of the necessary coils.

Figure 9:
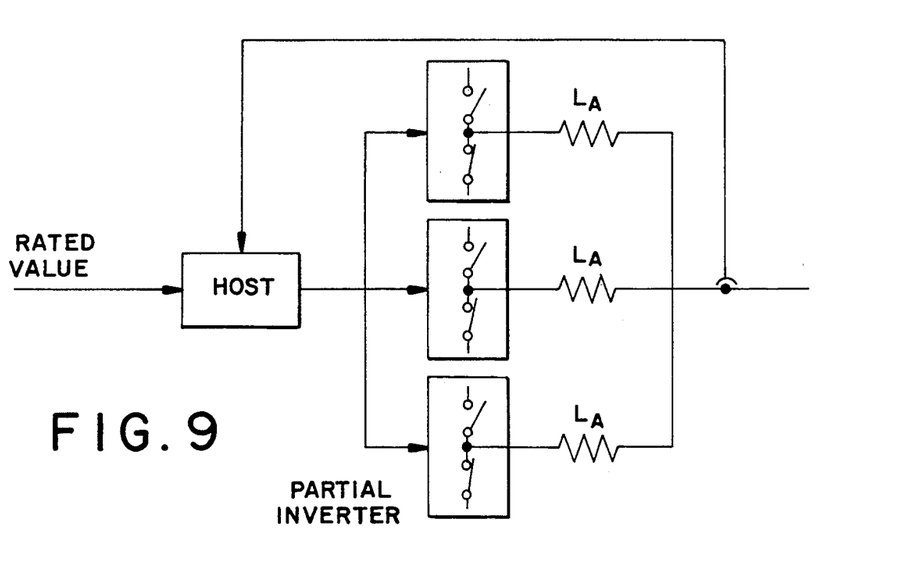
FIG. 9 shows the block diagram of an apparatus in which only the global current is measured.

The block diagram of FIG. 9 shows that in this case only the global current is measured. Upon a command of the host computer, and in dependence of a comparison with the rated value, all switches of the different partial inverters are being switched in and out simultaneously and in the same way. This removes the problem of the "hot path" between the different partial inverters, and in theory the connection coils may be discarded or, because they now have only an auxiliary function, they can be made much smaller.

In spite of its simplicity and obviousness, this solution can practically not be implemented. The switches, which are shown as simple lines in FIG. 9, actually consist of many elements, quite apart from their command device and so on. Local distribution and thermal influences can cooperate to produce a strongly asymmetric current distribution between the different partial inverters.

SUMMARY OF THE INVENTION

The invention aims at avoiding the above drawbacks and make it possible to switch several inverters directly at the apparatus level (concept: parallel inverters) in order to deliver the required power. To this end the invention is defined as described in the main claims. Apart from the power increase, one thus obtains very interesting characteristics which make the principle of parallel switching attractive, even from an economic and safety oriented view point, in spite of an increased expenditure in electronics.

The price of an inverter apparatus does not depend solely on the direct costs of the rectifier, but it depends also on the expenditure which is necessary in order to attain a certain reliability in operation and availability. In actual practice, this may possibly mean that a second apparatus must always be ready as an emergency unit. Apart from the doubled investment and maintenance costs, the doubled space requirement has a particularly negative effect on the commercial calculation. Further, the switch-over from a broken apparatus to the reserve apparatus always requires some time. In some cases it even necessitates an interruption of the operation. Especially in this respect the parallel connection proposed here opens a new vista with regard to the reliability and redundancy.

Figure 3:
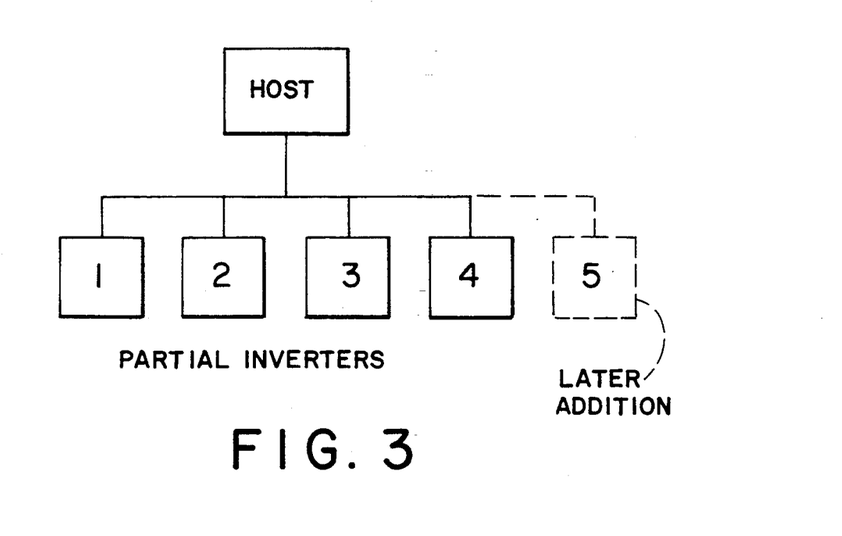
FIG. 3 shows a parallel inverter modified by adding a coupled partial inverter. The block designated as "host" represents a master computer system which commands the entire inverting apparatus.

A further point which is obvious when considering inverters connected in parallel is their modular arrangement. An entire family of inverters can be built with the same basic building blocks, so that it is unnecessary to design a corresponding number of different types. Apart from the advantage of fine variations in the power output, it is possible to upgrade an already installed plant, by simply adding further partial inverters, see FIG. 3.

BRIEF DESCRIPTION OF THE DRAWINGS

In what follows, the invention shall be illustrated in more details by a description of embodiments and with the help of the drawing, in which.

DETAILED DESCRIPTION OF THE PREFERRED EMBODIMENTS

A few principles which underlie the invention shall now be explained and illustrated by examples of embodiments.

Figure 10:
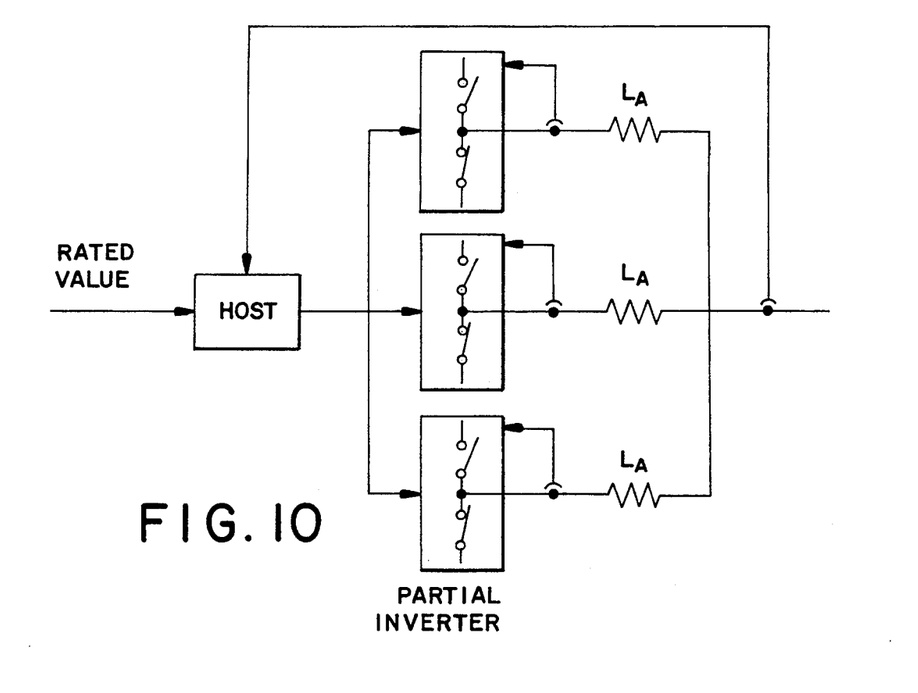
FIG. 10 shows the block diagram of an apparatus in which not only the global current but also the output currents of the different partial inverters is measured.

Small connecting coils can only be used when the switches work simultaneously and in the same direction. This necessarily entails an assymetry of the current because the different current paths may never be made absolutely identical. Therefore, a second, underlying control must be introduced, which must make the currents of the partial inverters symmetric. Because it is impossible to model exactly the different elements and current paths, this requires that the output currents of the partial inverters must be measured separately, see FIG. 10.

Figure 11:
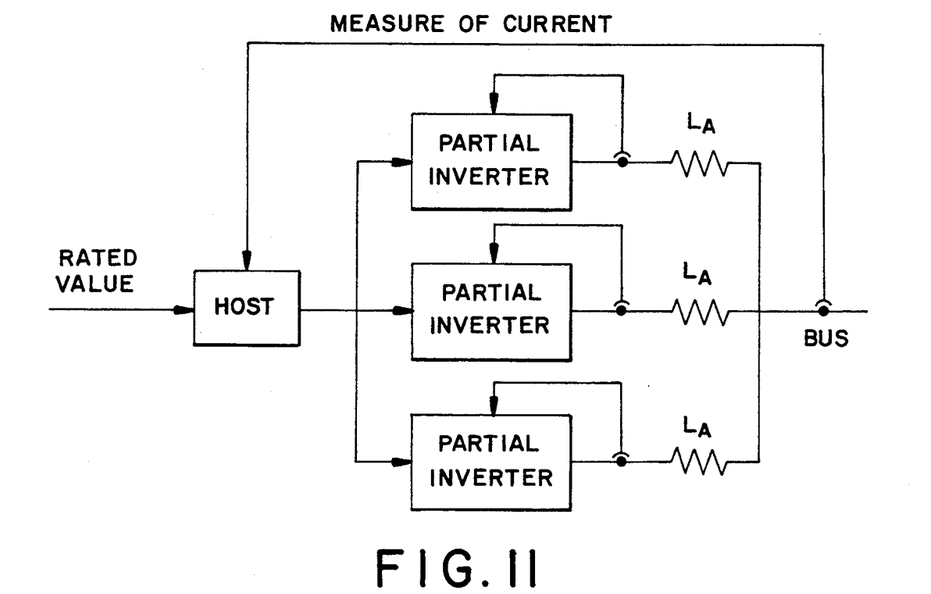
FIG. 11 shows three partial inverters which are directly connected in parallel, with a regulated global current and underneath a lossfree compensation ($L_A=$-connecting coils, all represented in only one phase)

Inverters which are directly connected in parallel can only be used without problems provided there exists an active and a lossless control which adequately suppresses all possible reasons for an assymetry of the current, and this even when there exists a coupling effect. The concept of the "compensation control which is fundamentally lossless" proposed here makes it unnecessary to know all reasons for the assymetry of the currents, and does also not require an exact knowledge of how they interact and function. FIG. 11 shows the block diagram of such a current control.

Instead of measuring the total current as shown in FIG. 11, one can use a control structure where one (or even several) partial inverters are used as reference, and where its output current provides the rated value for the other partial inverters. This control functions as follows.

The main control in the "host" determines, from a comparison of the total output current with the rated value, when the upper and when the lower switches of all partial inverters must be closed and opened, respectively. The main control simultaneously performs a simple division of the value of the total current through the number of partial inverters in the set, and this calculation indicates the current which each partial inverter should deliver under ideal conditions. This value is passed as a rated value to the compensation circuit of the partial inverters. If a partial inverter now notices that it delivers too much or too little current, then it will take this properly into account when the next switching occurs.

Figure 12:
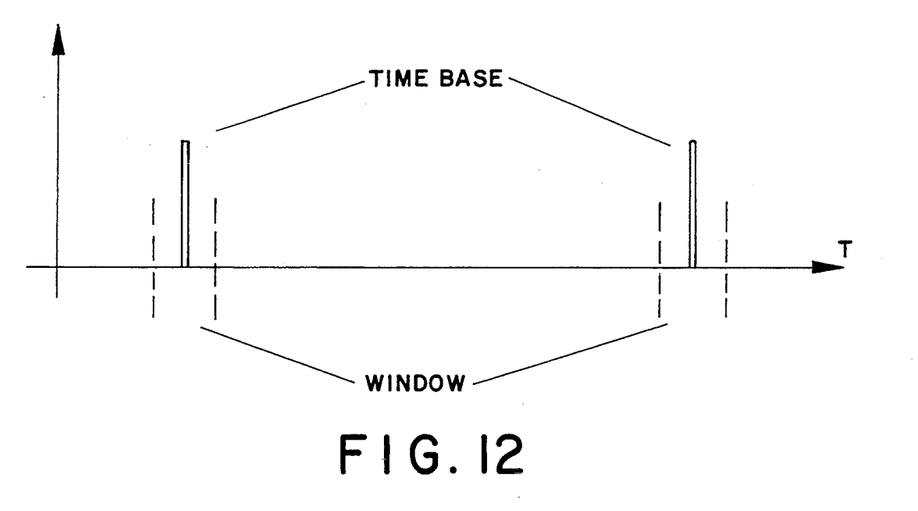
FIG. 12 shows the switching times of the main regulation (time instant zero) und the time window for the compensation. The compensation circuit of each partial inverter may shift the switching time of its own switch within this window.

Thus, the main control commands the partial inverters when they must open or close each switch. However, within a small domain, a window, each partial inverter is allowed to determine the exact timing for its switches on its own, in order to perform a small correction of the current, see FIG. 12.

If a partial inverter delivers too much current, then it will open the corresponding switch already before the "time zero". Contrariwise, another which delivers too little current will open its switch only after the "time zero", and thus provide the desired current correction, see FIG. 13.

Figure 13:
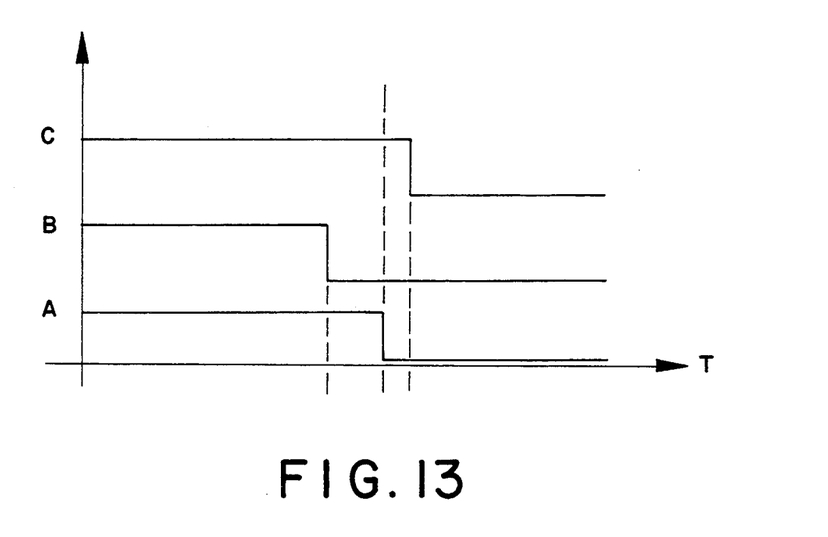
FIG. 13 shows the switching times of the main control (a), of a partial inverter which delivers too much current (b), and of a partial inverter which delivers too little current (c)

It follows that during a very short time interval the compensation control opens a "hot path" between the corresponding switches of the partial inverters. Essentially, only the connecting coils $L_A$ are present between these switches, and the size of these coils is determined by safety considerations. From the size of the connection coil and the voltage across the considered branch, one can calculate the time shift which is necessary between the switching times in order to obtain the desired current compensation. Because all measured values can only be determined and processed with limited accuracy, the compensation control becomes only active above a certain percentage deviation from the rated value. This avoids an unnecessary pushing back and forth of idle power between the switches.

Figure 14:
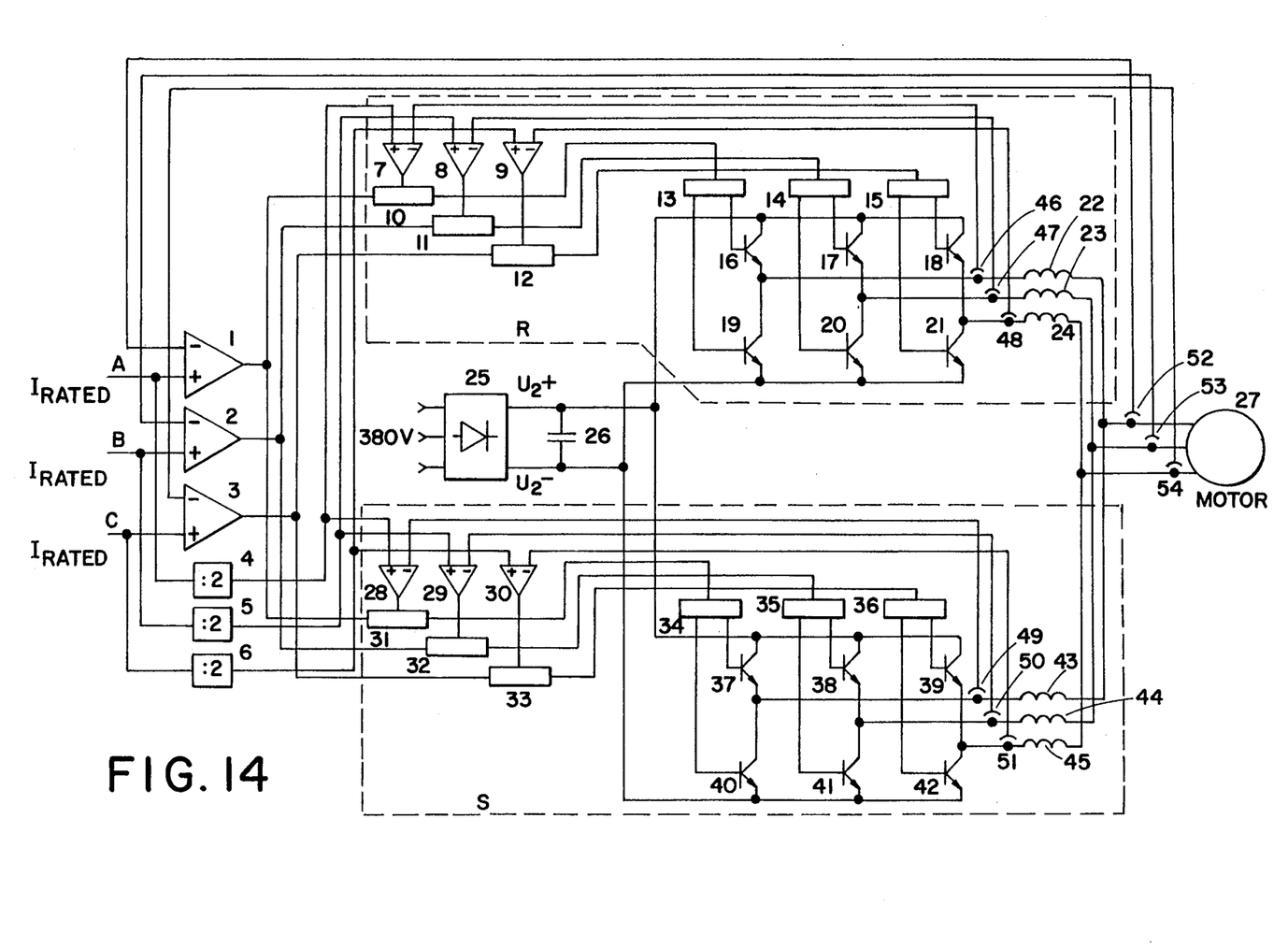
FIG. 14 shows an embodiment of the invention which comprises two three-phase transistor inverters which are connected in parallel.

FIG. 14 shows an apparatus according to the invention with two three-phase transistor inverters which are switched in parallel. Each of the two inverters shall deliver 50 percent of the output current.

The first inverter, also called partial inverter R, consists of the transistors 16 to 21, the transistor control units 13 to 15, the coils 22 to 24, the difference amplifiers 7 to 9, the variable signal delay units 10 to 12 as well as the current measuring units 46 to 48.

The second inverter, also called partial inverter S, consists of the transistors 37 to 42, the transistor control units 34 to 36, the coils 43 to 45, the difference amplifiers 28 to 30, the variable signal delay units 31 to 33 as well as the current measuring units 49 to 51.

The intermediate circuit is composed of the rectifier 25 and the intermediate circuit condenser 26, and is used for rectifying and filtering the three-phase current from the mains. Both partial inverters are connected to the same, common intermediate circuit.

The control system, also called host, consists of the comparators 1 to 3, the divisors of rated current values 4 to 6, as well as the current measuring units 52 to 54. The divisors of rated current values divide the rated values of the externally applied currents $I_{Rated\ A}$, $I_{Rated\ B}$ and $I_{Rated\ C}$ by two and thus calculate the rated current values which must be delivered by each of the two partial inverters. The current measuring units 52 to 54 measure the output currents of the entire inverter apparatus.

The load, which in this case is a three-phase motor 27, is connected to the mutually linked outputs of the two partial inverters.

If a motor is to be activated, then a corresponding three-phase rated value of a current must be input to the comparators 1 to 3 of the host ($I_{soll\ A}$, $I_{soll\ B}$, $I_{soll\ C}$), whereby naturally Kirchof's law must be satisfied, i.e. $I_{Rated\ A} + I_{Rated\ B} + I_{Rated\ C} = 0$.

In order to illustrate the working of the apparatus, only the phase A will be considered in what follows. The other two phases B and C work in a similar way.

If for instance the actual current of phase A is too small when compared to the rated value of the output current which is measured by the current measuring unit 52, then the comparator 1 instructs the two partial inverters to switch the two corresponding transistors on and off, respectively. This procedure will be called global current control.

If one now considers the partial inverter 1, the transistor 16 will in this case be switched on through the signal delay unit 10 and the transistor control unit 13; simultaneously the transistor 19 will be switched off. The ouput signal of comparator 1 is being delayed by a time interval $T_0 + \Delta T_1(A)$. The time interval $\Delta T_1(A)$ can be positive or negative, but its absolute value is always smaller than $T_0$, so that one has: $T_0 + \Delta T_1(A) > 0$ second. The compensating current of the partial inverter 1 can now be acted upon, in order to obtain a compensation. To this end, the differential amplifier 7 subtracts the actual value of the current which is measured by the current measuring unit 46 from the rated current value which is delivered by the distributor of rated current values 4. The difference is a measure for the deviation of the rated current value from the actual value pertaining to the partial inverter 1. If the rated value of the partial inverter 1 is too large, then the signal issued by the comparator 1 for switching the transistor will be delayed in a way which ensures that the actual value of the output current of the partial inverter 1 becomes equal to its rated value. In effect this means: if the actual value is too small, then $\Delta T_1(A)$ becomes negative when the transistor 16 is switched on and the transistor 19 is switched off, respectively becomes positive when the transistor 16 is being switched off and the transistor 19 is being switched on. During this control process, the coil 22 only limits the steepness of the current variation.

Considering now the partial inverter 2, transistor 37 will in this case be switched on and simultaneously the transistor 40 will be switched off, both through the signal delay unit 31 and the transistor control unit 34. The output signal of comparator 1 is being delayed by a time interval $T_0 + \Delta T_2(A)$ in the signal delay unit 31. The time interval $\Delta T_2(A)$ can be positive or negative, but its absolute value is always smaller than $T_0$, so that one has $T_0 + \Delta T_2(A) > 0$ second. This variable time delay $\Delta T_2(A)$ allows it to influence the output current of partial inverter 2 in a compensating way. To this end, the differential amplifier 28 subtracts the actual current value provided by the current measuring unit 49 from the rated value of the current which is provided by the divisor of rated current values 4. The difference is a measure for the deviation of the rated current value from the actual current value of the partial inverter 2. If the rated current value of the partial inverter 2 is too large, then the signal issued by comparator 1 for switching the transistors is being delayed in a way which ensures that the actual value of the output current of the partial inverter 2 becomes equal to its rated value. In effect this means: if the actual value is too small, then $\Delta T_2(A)$ becomes negative when transistor 37 is switched on and the transistor 40 is switched off, respectively becomes positive when the transistor 37 is switched off and the transistor 40 is switched on. During this control process, the coil 43 only limits the steepness of the current variation.

Because the failure of an inverter often entails the interruption of a whole working process, it must be at least ensured that a repair can take place in as short a time as possible. However, there are many applications where this does not suffice and where a practically uninterrupted operation is required even in the case of a failure.

Here, the principle of redundancy comes into its own. This means that defective parts of the system are disconnected from the system as a whole, and their tasks are taken over by other units. One distinguishes between dynamic and static redundancy:

Definition: dynamic redundancy systems where additional units are only added in the case of failure.

Definition: static redundancy systems where additional units are permanently used, even if there is no failure.

Dynamic redundancy:

In actual practice the dynamic redundancy requires that a fully-fledged second inverter apparatus must be ready to replace the active apparatus in the case of a failure. Fundamentally it does not matter whether a voltage is already applied to this stand-by unit or not, what matters is the time that is necessary until all power and command connections are switched over and the full working load can be output again. From an economical point of view the dynamic redundancy is particularly inefficient in the case of a single apparatus, because under normal conditions one unit is always unused. Apart from the doubled costs for investment and maintenance, the doubled space requirements are especially troublesome. The situation improves whenever several identical apparatuses operate on the same site, because a single additional inverter can be used as emergency device for all others. However, this presupposes that several inverters do not fail simultaneously, because only one may use the redundancy at any time.

Statical redundancy:

Naturally, the principle of dynamic redundancy can also be used for coupled inverters. The most interesting case relates to a connected inverter which consists of a certain number of partial inverters and is supported by an additional partial inverter provided for emergencies. Because the power of a partial inverter is comparatively small, the costs and the space requirements for the emergency unit are correspondingly low.

However, in the case of parallel connected inverters, the static redundancy is much more interesting than the dynamic redundancy. The following example may illustrate this:

It is required from an inverter apparatus to deliver a power of 350 kVA with high reliability. The apparatus comprises a set of connected inverters which comprises 8 partial inverters of 50 kVA each. Thus, the apparatus has a total power of 400 kVA. If a partial inverter suffers an irreversible failure, then it is disconnected from the set and the 7 remaining partial inverters remain in operation and can provide a maximum of 350 kVA.

There are different possibilities for disconnecting a damaged partial inverter as described above, two of which will now be described in more detail:

Disconnection by a mechanical procedure
Disconnection by an electro-thermal procedure.

Mechanical disconnection:

This encompasses manual procedures such as disconnecting cables or opening power switches. Because of the comparatively low power of a single partial inverter, the currents in question are also fairly low.

Electro-thermal disconnecting:

This measure takes advantage of the fact that powers up to about 50 kVA can be comparatively easily safeguarded with fusible cut-outs. When a defect occurs, the partial inverter in question can be "shot down" if necessary by a procedure where the $(n-1)$ sound partial inverters cooperate and globally "pump" so much current into the defect unit that its fusible cut-outs melt. This process can be executed on-line, which means that the load connected at the output, for instance a motor, practically does not notice the entire process. It will now be considered in more details how this "shooting down" takes place.

Figure 15:
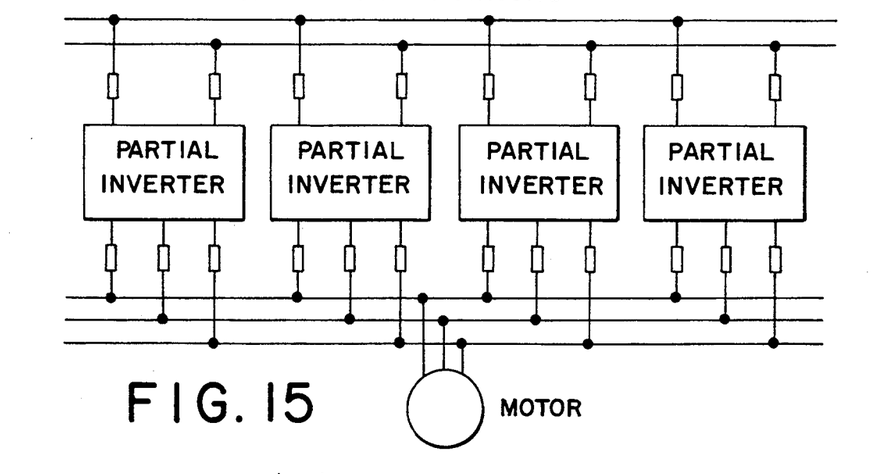
FIG. 15 is an apparatus which comprises melting fuses for the protection of the partial inverter when a hot path occurs.

Statical redundancy through "shooting down" partial inverters:

For this procedure the partial inverters are connected by fusible cut-outs both on the side of the intermediate circuit (corresponds to the input side) and on the output side. It is again stressed that these fusible cut-outs are not meant to protect the semi-conductors, a task for which they are much too slow, but are used solely for cutting out a defect partial inverter in case of need, see FIG. 15.

Figure 16:
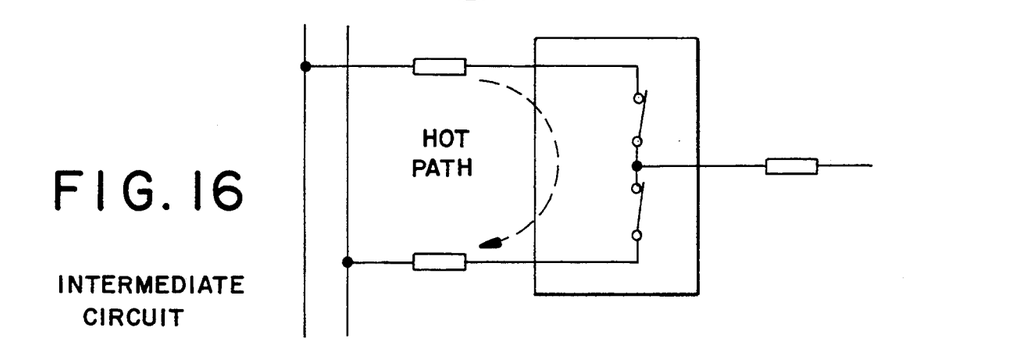
FIG. 16 shows how the fuses work when both the upper and the lower switch of a partial inverter are closed simultaneously.

In this procedure the fuses which are located on the side of the intermediate circuit are activated by a "hot path" within a partial inverter if the upper and the lower switches in a branch are closed simultaneously, see FIG. 16.

Figure 17:
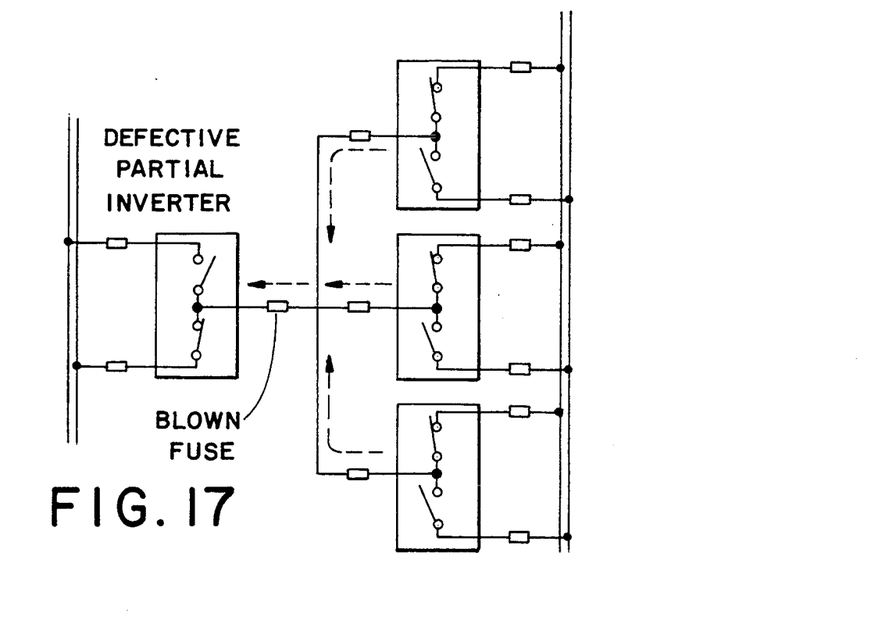
FIG. 17 shows how the fuses work when there is a defect in the phase control of a single partial inverter.

The output fuses enable a separation when, for some reason, the phase current of a partial inverter cannot be controlled any more. Here one supposes that the $(n-1)$ sound partial inverters are able to deliver enough current for a burn out of the corresponding phase fuse, see FIG. 17.

Again, the function of the system remains the same:

If a defect occurs in one partial inverter, its switches will be opened, and if this is not possible, the corresponding output fuse will be burned through and the operation continued with (n−1) partial inverters.

The technical resources necessary for this redundancy principle are comparatively small, considering that the whole procedure can be performed on-line. If one bases on the usual dimensioning, i.e. rated values, of an inverter apparatus where the rated power is always chosen larger than absolutely necessary, then it is often not even necessary to include additional power reserves for the redundancy.

The above mentioned fusible cut-outs can be replaced by other kinds of switches, in particular magnetic switches.

If several motors are operated in parallel, then an additional motor can be started by a partial inverter which has previously been disconnected. After the starting operation, this partial inverter is again connected with the remaining inverters.

In many cases a full power is only required at certain moments, for instance during start-up. At all other times a much smaller power suffices for the operations which must be performed. Therefore, one can conceive an inverter apparatus which consists of a large number of separate inverters which can be connected as desired on bus-bars through adequate switching means. In other words, the inverting power is dynamically distributed as necessary between the loads. This allows to reduce the overall rated inverting power in an apparatus.

Having thus described the invention, it is now claimed:

1. A method for switching in parallel, inverters with a pulse width modulation, where the number of outputs of each inverter is unrestricted and where the output parameters may be dictated arbitrarily, characterized in that the outputs are mutually connected, either directly or through impedance coils, that there is an arbitrary number of inverters switched in parallel via transistors, and that one controls the current distribution between the several inverters.

2. The method of claim 1, characterized in that a control parameter modifies the relation between the switching states, and in particular the ratio of the pulse lengths of the inverters which are connected in parallel, so as to enforce a freely chosen distribution of current between the several inverters.

3. The method according to claim 2, characterized in that no additional losses are produced.

4. The method according to claim 2, characterized in that the control parameter is calculated from at least two appropriate values, in particular from the rated current, the actual current, the asymmetry of the current, the effective inductivity between the inverter, the voltage across the output inductance, the voltage of the intermediate circuit.

5. The method according to one of claim 2, characterized in that the outputs of the inverters are mutually connected through output inductance coils which are either magnetically coupled or not.

6. The method according to one of claim 2, characterized in that the outputs of the inverters are mutually connected through current-modifying elements such as linear or non-linear resistances.

7. The method according to claim 2, characterized in that a control system or a group of control systems determines the operating parameters and the switching states of each single parallel connected inverter.

8. The method according to claim 2, characterized in that a control system structured into two or more levels determines the operating values and the switching states of each single parallel connected inverter.

9. The method according to claim 2, characterized in that each single one among the parallel connected inverters can take over the control function and thereby determine the operating values and the switching states of the other parallel connected inverters.

10. The method according to claim 2, characterized in that the control function, i.e. the determination of the operating values and switching states of the individual, parallel connected inverters alternates between the inverters, especially during operation and without interrupting the normal inverter operations.

11. The method according to claim 2, characterized in that, in order to ensure an uninterrupted operation of the inverters, and in particular to ensure a redundant service in case of a defect, single inverters belonging to a set of inverters connected in series or in parallel, or groups of such inverters, may be enabled and disabled at will and without interrupting the usual operation of the inverters.

12. The method according to claim 11, characterized in that said enabling and disabling is performed through switching devices, in particular electronic, thermal or mechanical ones.

13. The method according to claim 11, characterized in that the inputs of the connected inverters are connected by way of switching devices, in particular electronic, thermal or mechanical ones.

14. The method according to claim 11, characterized in that the outputs of the connected inverters are connected by way of switching methods, in particular electronic, thermal and mechanical ones.

15. The method according to claim 11, characterized in that defect inverters are disconnected through switching devices, in particular electronic, thermal or mechanical ones.

16. The method according to claim 11, characterized in that individual inverters within a set of mutually connected inverters can be disconnected during operation, for checking or servicing purposes.

17. The method according to claim 11, characterized in that certain inverters are commanded severally so as to act as start-up inverters.

18. The method according to claim 11, characterized in that arbitrarily chosen inverters, or groups of such, may be assigned one or several loads.

19. The method according to claim 11, characterized in that certain inverters are commanded so as to be enabled and disabled during operation, depending on the power requirement of the load.

* * * * *